US010606222B2

(12) United States Patent
Chou et al.

(10) Patent No.: US 10,606,222 B2
(45) Date of Patent: Mar. 31, 2020

(54) IDENTIFYING HOME AUTOMATION CORRELATED EVENTS AND CREATING PORTABLE RECIPES

(71) Applicant: International Business Machines Corporation, Armonk, NY (US)

(72) Inventors: Wei-Ting Chou, Taipei (TW); Wan-Tseng Hsiao, New Taipei (TW); Jeffrey C. H. Liu, Taipei (TW); Chih-Wen Su, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 14/828,571

(22) Filed: Aug. 18, 2015

(65) Prior Publication Data

US 2016/0232454 A1 Aug. 11, 2016

Related U.S. Application Data

(63) Continuation of application No. 14/619,309, filed on Feb. 11, 2015.

(51) Int. Cl.
*G05B 15/02* (2006.01)
*G06N 20/00* (2019.01)
(Continued)

(52) U.S. Cl.
CPC .......... *G05B 15/02* (2013.01); *G05B 19/048* (2013.01); *G05D 23/1393* (2013.01);
(Continued)

(58) Field of Classification Search
CPC .................................................... G05B 15/02
See application file for complete search history.

(56) References Cited

U.S. PATENT DOCUMENTS 8,306,634 B2 11/2012 Nguyen et al.
8,458,102 B2 6/2013 Bill
(Continued)

FOREIGN PATENT DOCUMENTS

CN 102763085 A 10/2012
CN 105897287 A 8/2016

OTHER PUBLICATIONS

IBM, "List of IBM Patents or Patent Applications Treated as Related (Appendix P)," Sep. 7, 2017, p. 1-2.
(Continued)

*Primary Examiner* — Tejal Gami
(74) *Attorney, Agent, or Firm* — Dmitry Paskalov (57) ABSTRACT

A method for creating at least one portable environment recipe associated with at least one user and associated with an underlying architecture, whereby the underlying architecture includes an underlying actuator architecture or an underlying sensor architecture is provided. The method may include collecting a plurality of behavior data associated with the underlying architecture and the at least one user, wherein the at least one user is located at a first location. The method may further include analyzing the collected plurality of behavior data. The method may also include identifying at least one behavior pattern based on the analyzed plurality of behavior data. The method may include creating the at least one portable environment recipe based on the identified at least one behavior pattern. The method may also include uploading the created environment recipe to a repository.

7 Claims, 9 Drawing Sheets

(51) Int. Cl.
*H04L 12/28* (2006.01)
*G05B 19/048* (2006.01)
*G05D 23/13* (2006.01)

(52) U.S. Cl.
CPC ......... *G06N 20/00* (2019.01); *H04L 12/2829* (2013.01); *G05B 2219/2614* (2013.01); *G05B 2219/2642* (2013.01)

(56) References Cited

U.S. PATENT DOCUMENTS

| | | |
|---|---|---|
| 2002/0086271 A1 | 7/2002 | Murgia et al. |
| 2004/0030531 A1 | 2/2004 | Miller et al. |
| 2004/0107128 A1 | 6/2004 | Weaver |
| 2004/0116783 A1 | 6/2004 | Weaver |
| 2004/0143453 A1 | 7/2004 | Weaver |
| 2014/0108019 A1 | 4/2014 | Ehsani et al. |
| 2014/0309863 A1* | 10/2014 | Ricci ................. G01C 21/3484 701/36 |
| 2014/0358291 A1* | 12/2014 | Wells ................. G05D 23/1902 700/276 |
| 2015/0227118 A1 | 8/2015 | Wong |
| 2015/0281252 A1 | 10/2015 | Melcher et al. |
| 2015/0330652 A1 | 11/2015 | Kim |
| 2016/0094883 A1 | 3/2016 | Tidwell et al. |
| 2016/0231717 A1 | 8/2016 | Chou et al. |
| 2016/0232454 A1 | 8/2016 | Chou et al. |
| 2016/0294959 A1 | 10/2016 | Cho |

OTHER PUBLICATIONS

Savant, "What is Savant," Savant Pro Smart Home System, p. 1-8, Savant Systems LLC, https://www.savant.com/savant-pro, Accessed on Jun. 26, 2017.

Chou et al., "Identifying Home Automation Correlated Events and Creating Portable Recipes," Filed on Feb. 11, 2015, p. 1-37, U.S. Appl. No. 14/619,309.

IBM, "The IBM vision of a smarter home enabled by cloud technology," IBM Sales & Distribution White Paper, 2010, p. 1-15, Global Electronics Industry.

Mell et al., "The NIST Definition of Cloud Computing," National Institute of Standards and Technology, Information Technology Laboratory, Oct. 7, 2009, Version 15.

* cited by examiner

IDENTIFYING HOME AUTOMATION CORRELATED EVENTS AND CREATING PORTABLE RECIPES

BACKGROUND

The present invention relates generally to the field of computers, and more particularly to portable user behavior patterns.

There are many sensors and actuators available in the living environment that may continuously detect the environment's condition and a user's behavior in order to react to a particular environment condition. As such, the sensor and actuator may be fully connected to a smart home (or smart building) controller so that the user's behaviors may be recorded and analyzed in a way that the system can predict the type of settings that may be most suitable for a user in a particular environment. This is a typical smart home setting in which the user's behaviors may be captured to generate a behavior pattern.

SUMMARY

According to one embodiment, a method for creating at least one portable environment recipe associated with at least one user and associated with an underlying architecture, whereby the underlying architecture includes an underlying actuator architecture or an underlying sensor architecture is provided. The method may include collecting, by a first environment controller, a plurality of behavior data associated with the underlying architecture and the at least one user, wherein the at least one user is located at a first location. The method may further include analyzing, by the first environment controller, the collected plurality of behavior data. The method may also include identifying, by the first environment controller, at least one behavior pattern based on the analyzed plurality of behavior data. The method may include creating, by the first environment controller, the at least one portable environment recipe based on the identified at least one behavior pattern. The method may also include uploading, by the first environment controller, the created environment recipe to a repository.

According to another embodiment, a computer system for creating at least one portable environment recipe associated with at least one user and associated with an underlying architecture, whereby the underlying architecture includes an underlying actuator architecture or an underlying sensor architecture is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include collecting, by a first environment controller, a plurality of behavior data associated with the underlying architecture and the at least one user, wherein the at least one user is located at a first location. The method may further include analyzing, by the first environment controller, the collected plurality of behavior data. The method may also include identifying, by the first environment controller, at least one behavior pattern based on the analyzed plurality of behavior data. The method may include creating, by the first environment controller, the at least one portable environment recipe based on the identified at least one behavior pattern. The method may also include uploading, by the first environment controller, the created environment recipe to a repository.

According to yet another embodiment, a computer program product for creating at least one portable environment recipe associated with at least one user and associated with an underlying architecture, whereby the underlying architecture includes an underlying actuator architecture or an underlying sensor architecture is provided. The computer program product may include one or more computer-readable storage devices and program instructions stored on at least one of the one or me tangible storage devices, the program instructions executable by a processor. The computer program product may include program instructions to collect, by a first environment controller, a plurality of behavior data associated with the underlying architecture and the at least one user, wherein the at least one user is located at a first location. The computer program product may further include program instructions to analyze, by the first environment controller, the collected plurality of behavior data. The computer program product may also include program instructions to identify, by the first environment controller, at least one behavior pattern based on the analyzed plurality of behavior data. The computer program product may include program instructions to create, by the first environment controller, the at least one portable environment recipe based on the identified at least one behavior pattern. The computer program product may also include program instructions to upload, by the first environment controller, the created environment recipe to a repository.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to portable user behavior patterns. The following described exemplary embodiments provide a system, method and program product to, among other things, identify home automation correlated events and create portable recipes. Additionally, the present embodiment has the capacity to improve the technical field of smart location interaction systems by capturing environment settings and data correlated to user behavior patterns at an abstract level and porting the behavior and settings from one environment to another.

As previously described, a sensor and actuator may be fully connected to a smart location (e.g., a smart home or smart building) controller so that a user's behaviors may be recorded and analyzed in a way that the present embodiment may intelligently predict what kind of settings are most suitable for a user in a particular environment. However, the typical smart location systems today are limited to a fixed location in which the data is collected from one specific location and cannot be applied to an alternate location. As such, current methods capture a user behavior model in one environment and therefore, the user's behavior predication can only be applied to that particular location. More specifically, the current behavior models are tightly coupled with the sensors where the user data was collected from. For example, there may be a situation where a user travels to a new location (a hotel or a rental house) where the new location has a similar set of sensors or actuators (even though the number of sensors and their placement might not exactly the same in the new location). Today, there is no way today to transfer the "user behavior" from one place to another so that the environment can quickly identify what may be the most comfortable setting for the user within that particular new environment. As such, it may be advantageous, among other things, to identify home automation correlated events and create portable recipes so that a user may be able to access their portable recipes and apply the portable recipes in an alternate location.

The present embodiment may create user behavior patterns that are portable across multiple locations. According to at least one implementation, an abstraction layer of underlying sensors may be created so that user behavior is not bound to a set of physical devices. As such, an environment recipe may consist of the architecture of the sensor or actuator of the location; the identity of the user in which the environment recipe belongs to; and the behavior patterns (i.e., a set of policies) generated by analyzing the user's behavior in the monitored environment. Additionally, when a user moves to a new location or place, the environment controller of that new location may identify the user; lookup the user's environment recipe in a cloud based storage by comparing the sensor or actuator architecture of the current location with the architecture of the existing, stored recipes; and apply the stored recipes by replacing the sensor or actuator of the current location. Furthermore, since the environment recipe includes the identity of the user(s), the environment controller may detect the presence of multiple users and lookup a recipe that is most suitable for the users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to identify home automation correlated events and create portable recipes. Embodiments of the present invention may create an abstraction of user behavior patterns and the underlying sensor/actuator architecture. Then, the "environment recipe" may be generated from at least one place and may be applied to any other place as long as the sensor/actuator architecture matches the stored sensor/actuator. As such, an environment controller may execute an "environment recipe" for a particular user(s) and bind the abstracted actuator commands to the real actuator of the environment. Furthermore, according to at least one implementation, the environment recipes may be persisted in a repository, such as a cloud based storage so a user can continuously update their behavior model no matter where the user may be located and the user may browse and apply the recipe created by others as long as the architecture matches. Additionally, the environment controller may recognize the users in the environment and apply an appropriate recipe that is most suitable for all users.

Figure 1:
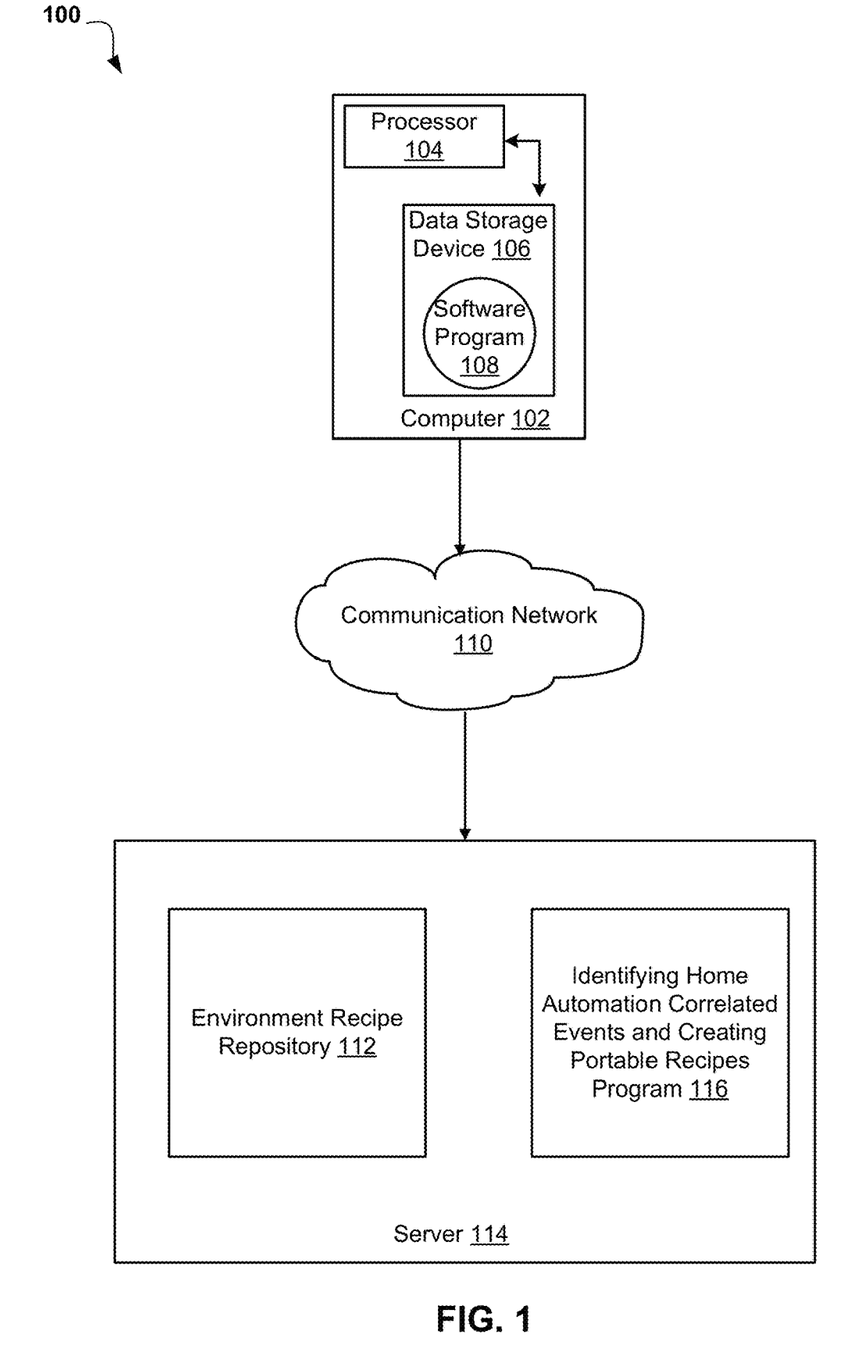
FIG. 1 illustrates a networked computer environment according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run an Identifying Home Automation Correlated Events and Creating Portable Recipes Program 116 that may interact with an Environment Recipe Repository 112, and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Environment Recipe Repository 112 and the Identifying Home Automation Correlated Events and Creating Portable Recipes Program 116 running on server computer 114 via the communications network 110. The communications network 110 may include connections, such as wire, wireless communication links, or fiber optic cables. As will be discussed with reference to FIG. 6, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a server 114.

As previously described, the client computer 102 may access the Environment Recipe Repository 112 or the Identifying Home Automation Correlated Events and Creating Portable Recipes Program 116, running on server computer 114 via the communications network 110. For example, a user using an application program 108 (e.g., Firefox®) (Firefox and all Firefox-based trademarks and logos are trademarks or registered trademarks of Mozilla and/or its affiliates) running on a client computer 102 may connect via a communication network 110 to the Environment Recipe Repository 112 or the Identifying Home Automation Correlated Events and Creating Portable Recipes Program 116 which may be running on server computer 114. As previously described, the Identifying Home Automation Correlated Events and Creating Portable Recipes Program 116 may identify home automation correlated events and create portable recipes by creating an abstraction of user behavior patterns and an underlying sensor/actuator architecture. Therefore, the "environment recipe" may be generated from at least one place and may be applied to any other place as long as the sensor/actuator architecture matches the stored sensor/actuator. The Identifying Home Automation Correlated Events and Creating Portable Recipes method is explained in more detail below with respect to FIGS. 5A-5B.

Figure 2:
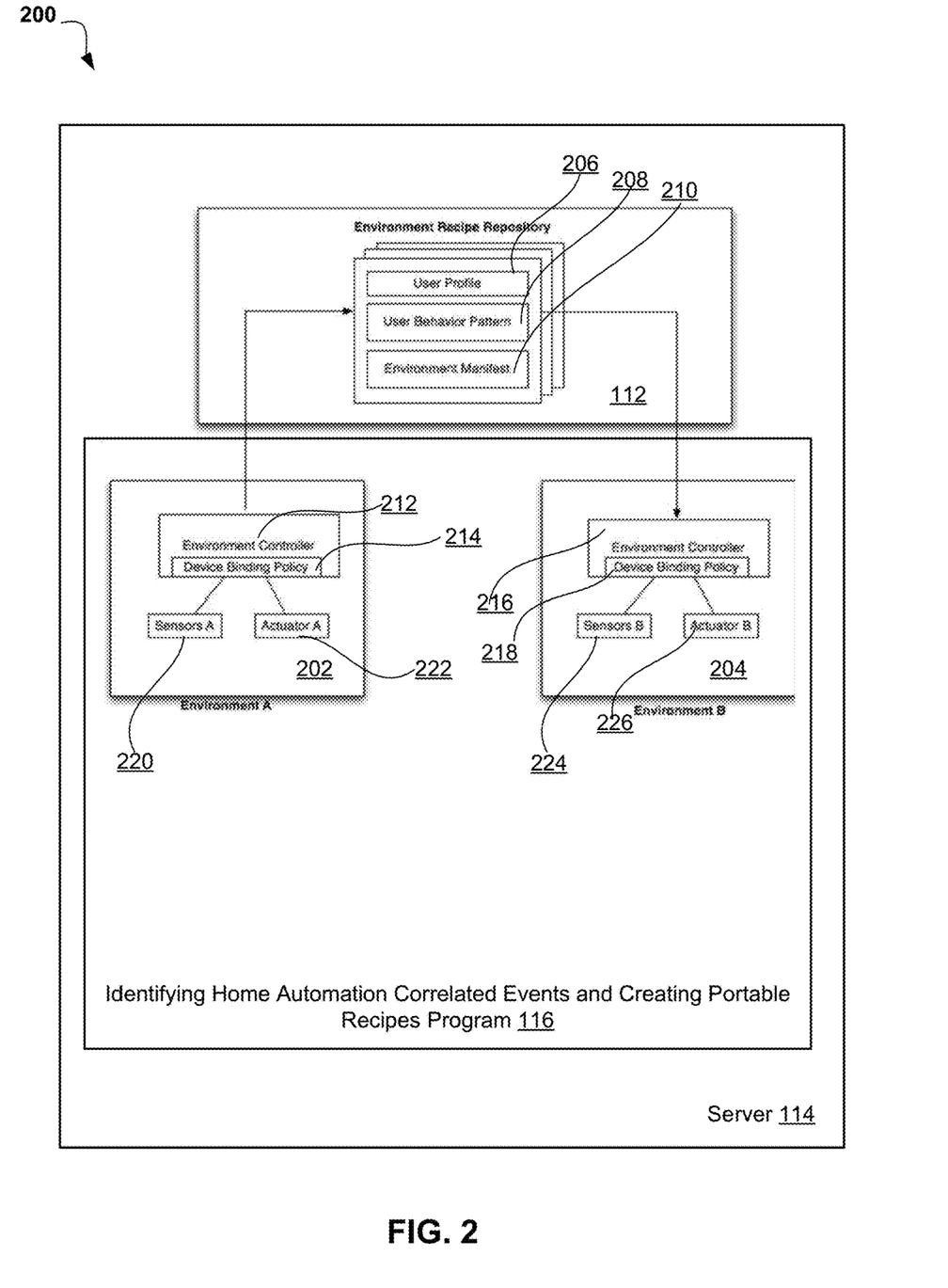
FIG. 2 illustrates a system architecture according to one embodiment.

Referring to FIG. 2, an illustration of a system architecture 200 in accordance with one embodiment is depicted. According to at least one implementation, the Environment recipe Repository 112 may be a cloud based storage that may allow a user to upload or download environment recipes from different environments or locations 202, 204. As such, an environment recipe may consist of a user profile 206 that may include the identity of the user that creates the recipe. The environment recipe may also include a user behavior pattern 208 that may be generated by analyzing the settings and changes of the sensors or actuators 220-226 for finding a user's preference for the environment 202, 204. Additionally the environment recipe may include an environment manifest 210 which includes the architecture of the sensors or actuators 220-226 which the user behavior pattern may be generated from. Furthermore, the Identifying Home Automation Correlated Events and Creating Portable Recipes Program 116 may include a device binding policy 214, 218. The device binding policy 214, 218 may be a policy of how to apply an environment recipe into a secondary environment (e.g., environment B 204) which may be different from the original environment (e.g., environment A 202) that defined the recipe. According to at least one implementation, the policy 214, 218 may be run by the environment controller 212, 216.

Figure 3:
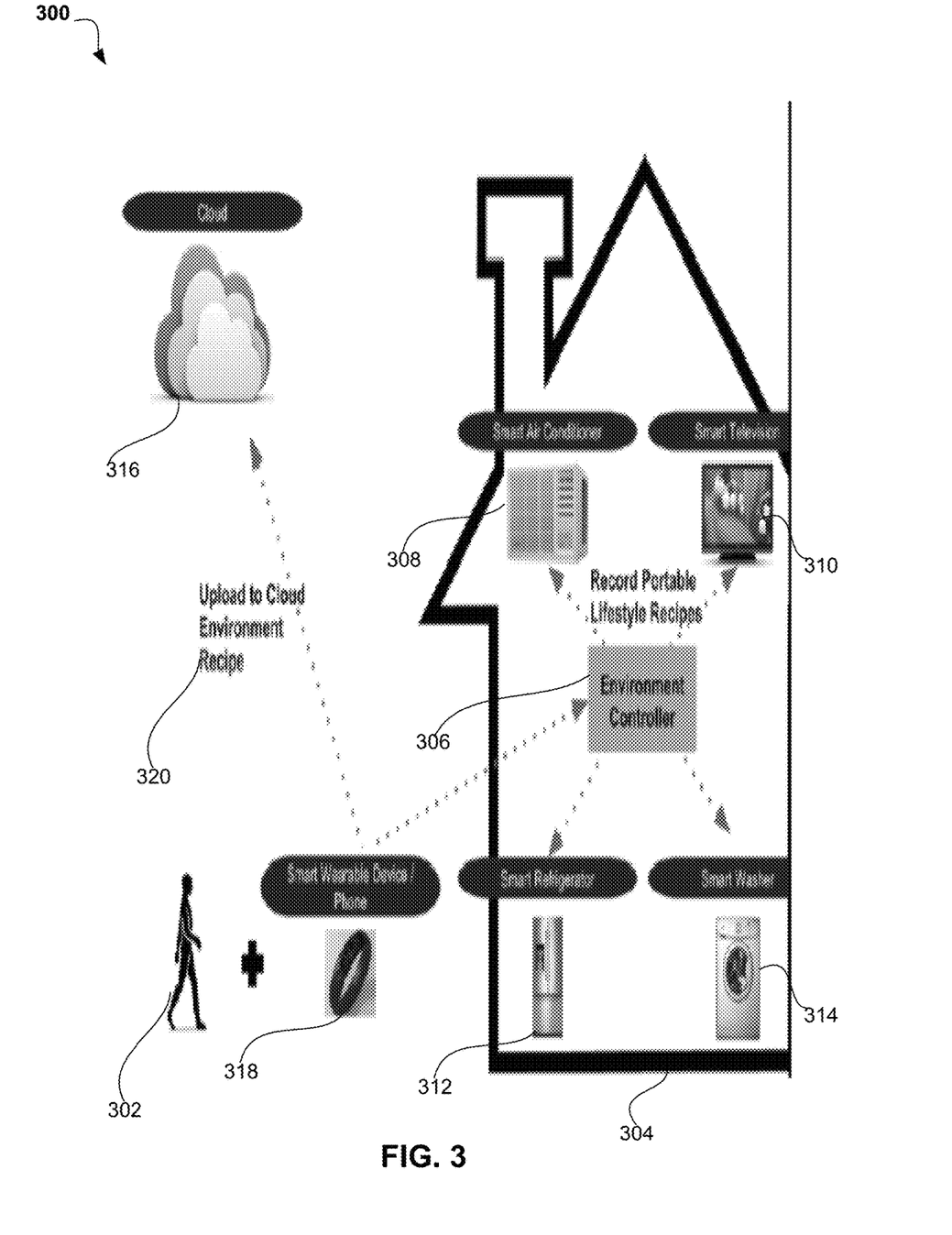
FIG. 3 is an exemplary illustration of creating an environment recipe according to one embodiment.

Referring to FIG. 3, an exemplary illustration of creating an environment recipe 300 in accordance with one embodiment is depicted. With respect to FIG. 2, a user 302, using a smart wearable device/phone 318 may live in a smart home 304 (or building) which has a smart environment controller 306 to control such items as the air conditioner 308, the television 310, the refrigerator 312, and the washer 314. In the user's 302 daily life, he/she may always do tasks such as:
prerecord their favorite TV show from 4 pm to 6 pm since they are still at the office during that time
turn on the air conditioner 10 minutes before they arrive home
ask the refrigerator to tell them whether their milk is about to expire
washes their clothes twice a week.

According to at least one implementation of the present embodiment, settings (such as the above described settings) of the devices/sensors may be collected in the environment controller 306. Then the environment controller 306 may analyze the above described data to identify the user's 302 behavior pattern to create an environment recipe 320 such as the following:
User profile: Name of user 302
User behavior pattern: 1) TV 310: prerecord channel 40 from 4 pm to 6 pm,
  2) AC 308: turn on at 6:20 pm,
  3) Refrigerator 312: check the expiration date of the milk,
  4) Washer 314: wash the clothes on Tuesday and Friday.
Environment manifest: 1) TV,
  2) Air conditioner,
  3) Refrigerator, and
  4) Washer.

The created recipe 320 may then be uploaded to a Cloud based storage 316.

Figure 4:
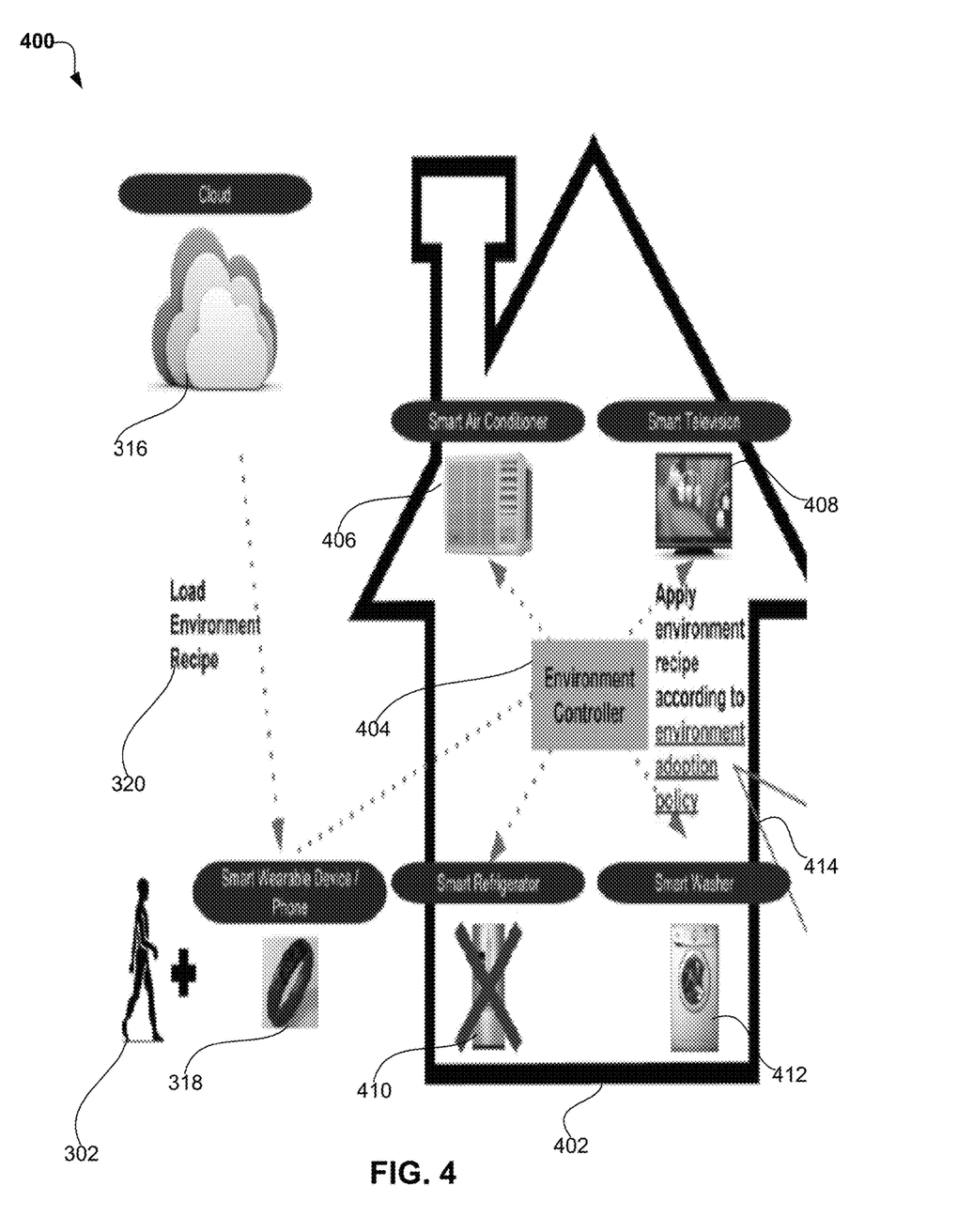
FIG. 4 is an exemplary illustration of applying an environment recipe according to one embodiment.

Referring to FIG. 4, an exemplary illustration of applying an environment recipe 400 in accordance with one embodiment is depicted. For example, a user 302 may take a business trip to another city for a month. The user 302, using the smart wearable device/phone 318 wants to take their old habits (i.e., preferences) from their home 304 (FIG. 3), with them. For example, after the user 302 settles down at the hotel 402, the user 302 can download the recipe 320 the user 302 built at home 304 (FIG. 3) and apply the recipe 320 to the new environment 402. As such, according to one implementation, the environment controller 404 of the new location 402 may load the environment recipe 320 from the cloud based storage 316 and apply the environment recipe 320 with the device binding policy 414. When the environment controller 404 sorts through the policy 414, the environment controller 404 may notice that the new environment 402 does not have a refrigerator 312 (FIG. 3). Therefore, in this case, the environment controller 404 may apply all the user behavior patterns from the environment recipe 320 (as previously described above with respect to FIG. 3 to such items as the AC 406, the TV 408, and the washer 412) with the exception of the refrigerator 410 behavior pattern as depicted in FIG. 4

Figure 5A:
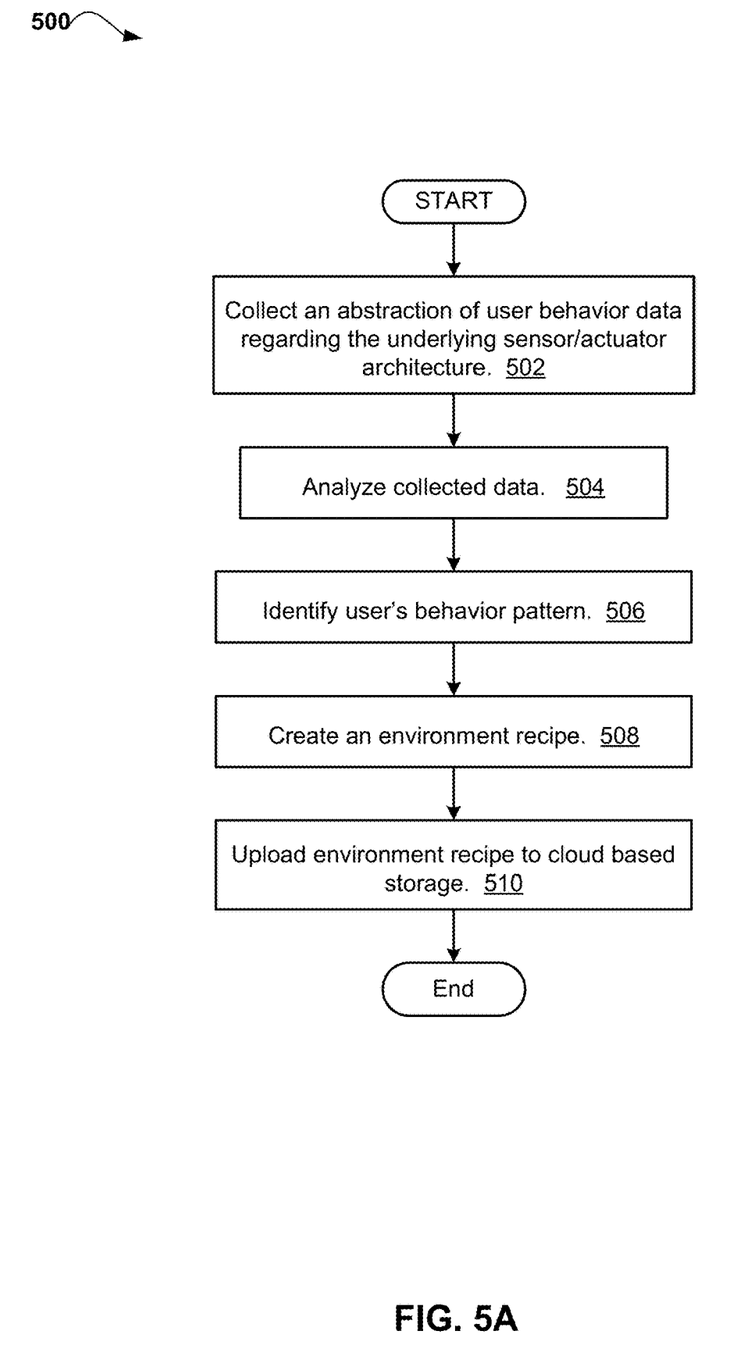
FIGS. 5A-5B is an operational flowchart illustrating the steps carried out by a program for identifying home automation correlated events and creating portable recipes according to at least one embodiment.
Figure 5B:
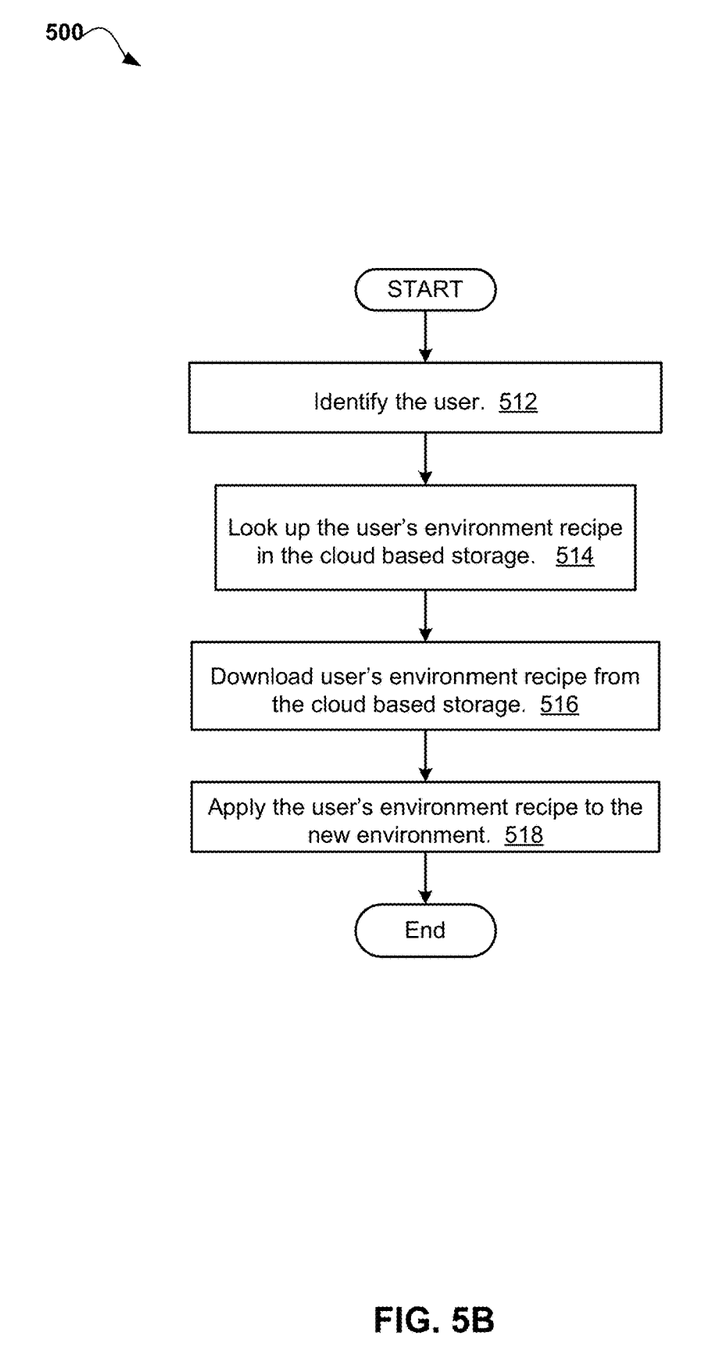

Referring to FIGS. 5A-5B, an operational flowchart 500 illustrating the steps carried out by a program for identifying home automation correlated events and creating portable recipes in accordance with one embodiment is depicted. As previously described, the present embodiment may identify home automation correlated events and create portable recipes. According to at least one implementation, the present embodiment may provide a mechanism to make user behavior patterns portable across multiple locations by creating an abstraction layer of underlying sensors so that user behavior is not bound to a set of physical devices.

As such, with respect to FIG. 5A, an environment recipe may be created that consists of the following: an architecture of the sensor/actuator of the location; identifying the user of whom the environment recipe belongs to; and generating the behavior patterns (a set of policies) by analyzing the user's behavior in a monitored environment.

At 502, an abstraction of user behavior data regarding the underlying sensor/actuator architecture is collected. As such, the environment controller 306 (FIG. 3) for the primary location of the user may monitor and collect user behavior patterns with respect to the sensors or actuators of a primary location. An example of user behavior patterns may be user preferences, such as the following: a user may prerecord their favorite TV show from 4 pm to 6 pm; turn on the air conditioner 10 minutes before they arrive home; ask the refrigerator to tell them whether their milk is about to expire; and the user may wash their clothes twice a week. According to at least one implementation of the present embodiment, all the above settings of the devices/sensors may be collected in the environment controller 306 (FIG. 1) of the primary location.

Then at 504, the collected data is analyzed. As such, the environment controller of the primary location 306 (FIG. 1) may analyze the data that was collected based on the monitoring of the user behavior patterns.

Then, at 506, the user's behavior pattern is identified. Therefore, the environment controller of the primary location 306 (FIG. 1) may identify the user's behavior pattern based on the analysis to create an environment recipe. According to at least one implementation of the present embodiment, behavior patterns may be a set of policies generated by analyzing the user's behavior in the monitored environment.

Next at 508, an environment recipe is created for the primary location. According to at least one implementation, an environment recipe may include a user profile that identifies the user along with the user's behavior pattern comprising of the collected user behavior data from the previous step 502.

Then at 510, the environment recipe is uploaded to a repository 112 (FIG. 1), such as a cloud based storage. As such, the environment recipes may be persisted in the cloud (i.e., cloud based storage (i.e., repository 112 (FIG. 1))) so a user can continuously update their behavior model no matter where the user may be located and the user may browse recipe created by others as long as the architecture matches. As such, according to an alternate implementation, a user may not only be able to apply a recipe created by themselves, but may also be able to apply a recipe created by others as long as the architecture matches. According to at least one implementation, the user may access their stored environment recipe for example, via a graphical user interface, in order to maintain a current state of their user behavior patterns. The environment recipe may be applied to any other place or location as long as the sensor/actuator architecture of the secondary location matches the stored sensor/actuator of the primary location. As such, a primary environment controller 306 (FIG. 3) may execute an environment recipe for a particular user(s) and bind the abstracted actuator commands to the real actuator of the primary environment (i.e., location). Additionally, the environment controller 404 (FIG. 4) of the secondary location may recognize the users in the environment and apply an appropriate recipe that is most suitable for all users.

FIG. 5B illustrates an environment recipe being applied to a secondary location. For example, when a user moves to a new place, the environment controller 404 (FIG. 4) of the new place, may first identify the user, lookup their environment recipe in the cloud by comparing the sensor/actuator architecture of current location with the architecture of those existing recipes, and apply the recipes by replacing the sensor/actuator of current location.

At 512, the user is identified. As such, the environment controller 404 (FIG. 4) of the new location may detect the presence of a user and first identify the user by looking up the user's identity in a cloud based storage repository 112 (FIG. 1). According to at least one implementation, the user's identity is part of the environment recipe that is stored in a cloud based storage repository 112 (FIG. 1). As such, the environment recipe may consist of a user profile 206 (FIG. 2) that may include the identity of the user that creates the recipe. The environment recipe is not limited to one user, but rather may include the identity of multiple users. Therefore, the environment controller 404 (FIG. 4) of the new location may identify the user by searching through the profiles of the stored environment recipes.

Next at 514, the user's environment recipe is retrieved from the cloud based storage. As such, once the environment controller of the new location 404 (FIG. 4) identifies the detected user, the environment controller of the new location 404 (FIG. 4) may retrieve the recipe that is a match for the user. According to at least one implementation, the environment controller of the new location 404 (FIG. 4) may detect the presence of multiple users and therefore, may look up a recipe that is most suitable for all of the detected users.

Then at 516, the environment controller of the new location 404 (FIG. 4) may download the user's environment recipe from the cloud based storage. Next at 518, the environment controller of the new location 404 (FIG. 4) may apply the downloaded user's environment recipe to the new location. For example, the environment controller 404 (FIG. 4) of the new location may load the environment recipe from the cloud based storage 112 (FIG. 1) and apply the environment recipe with the device binding policy 414 (FIG. 4). When the environment controller 404 (FIG. 4) sorts through the policy 414 (FIG. 4), the environment controller 404 (FIG. 4) may notice that the new environment does not have an appliance, such as a refrigerator. Therefore, in this case, the environment controller 404 (FIG. 4) may apply all the user behavior patterns from the downloaded environment recipe with the exception of the refrigerator.

It may be appreciated that FIGS. 5A-5B provide only an illustration of one implementation and does not imply any limitations with regard to how different embodiments may be implemented. Many modifications to the depicted environments may be made based on design and implementation requirements. For example, as previously described with respect to an alternate implementation, a user can continuously update their behavior model no matter where the user may be located and the user may browse and apply a recipe created by others as long as the architecture matches.

Figure 6:
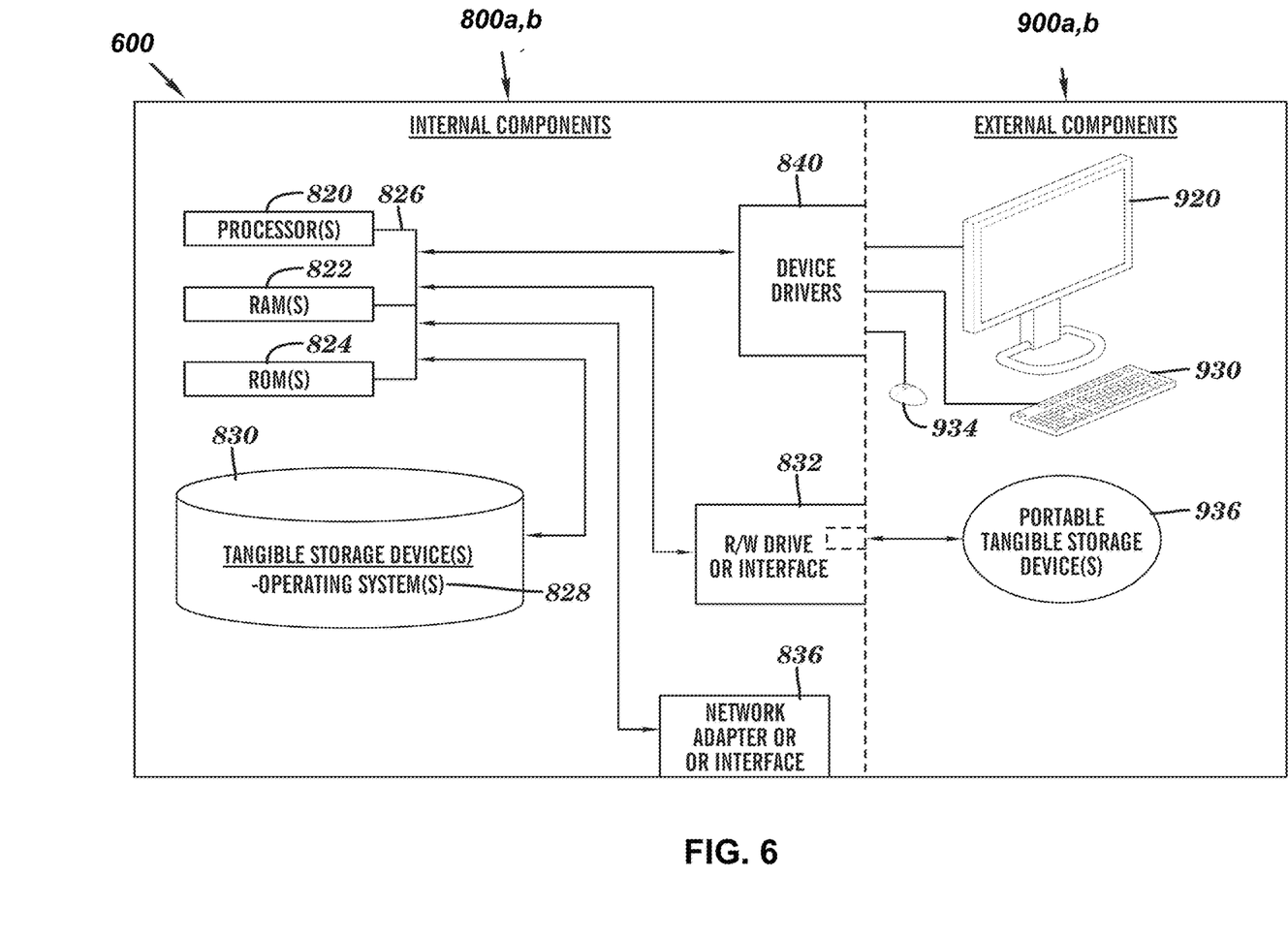
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 *a,b* and external components 900 *a,b* illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) in client computer 102 (FIG. 1) and the Identifying Home Automation Correlated Events and Creating Portable Recipes Program 116 (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Identifying Home Automation Correlated Events and Creating Portable Recipes Program 116 (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) in client computer 102 (FIG. 1) and the Identifying Home Automation Correlated Events and Creating Portable Recipes Program 116 (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) in client computer 102 (FIG. 1) and the Identifying Home Automation Correlated Events and Creating Portable Recipes Program 116 (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
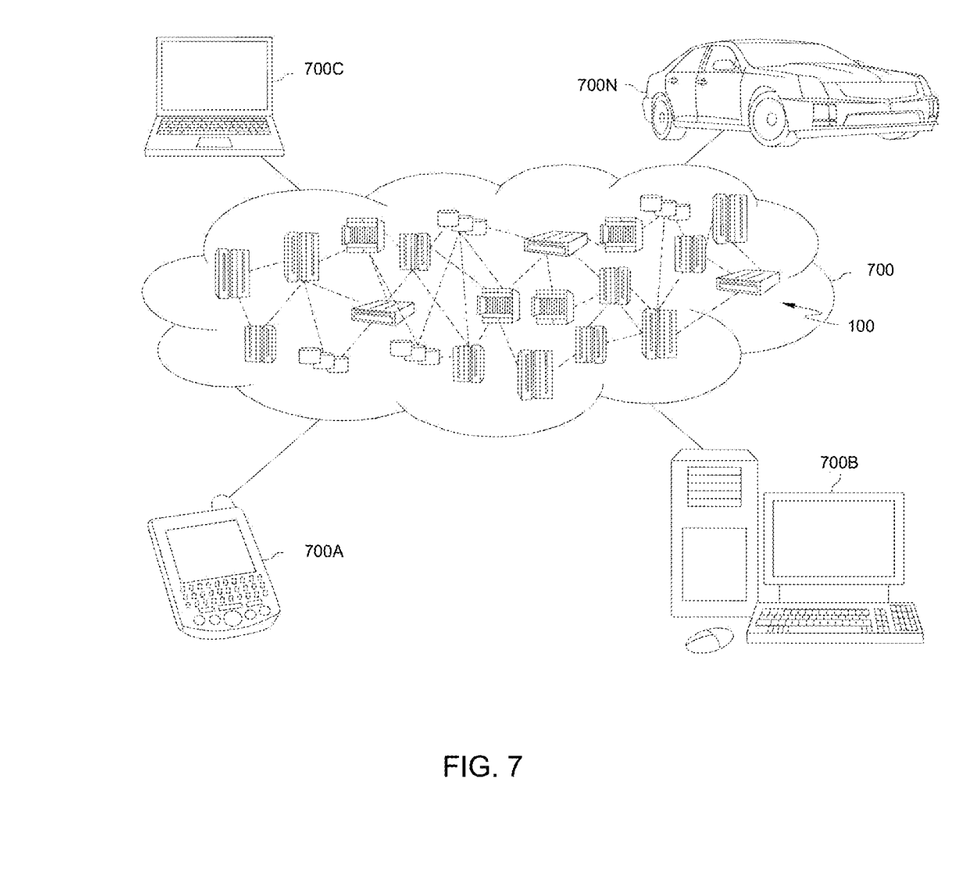
FIG. 7 is a block diagram of an illustrative cloud computing environment including the computer system depicted in FIG. 1, in accordance with an embodiment of the present disclosure.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
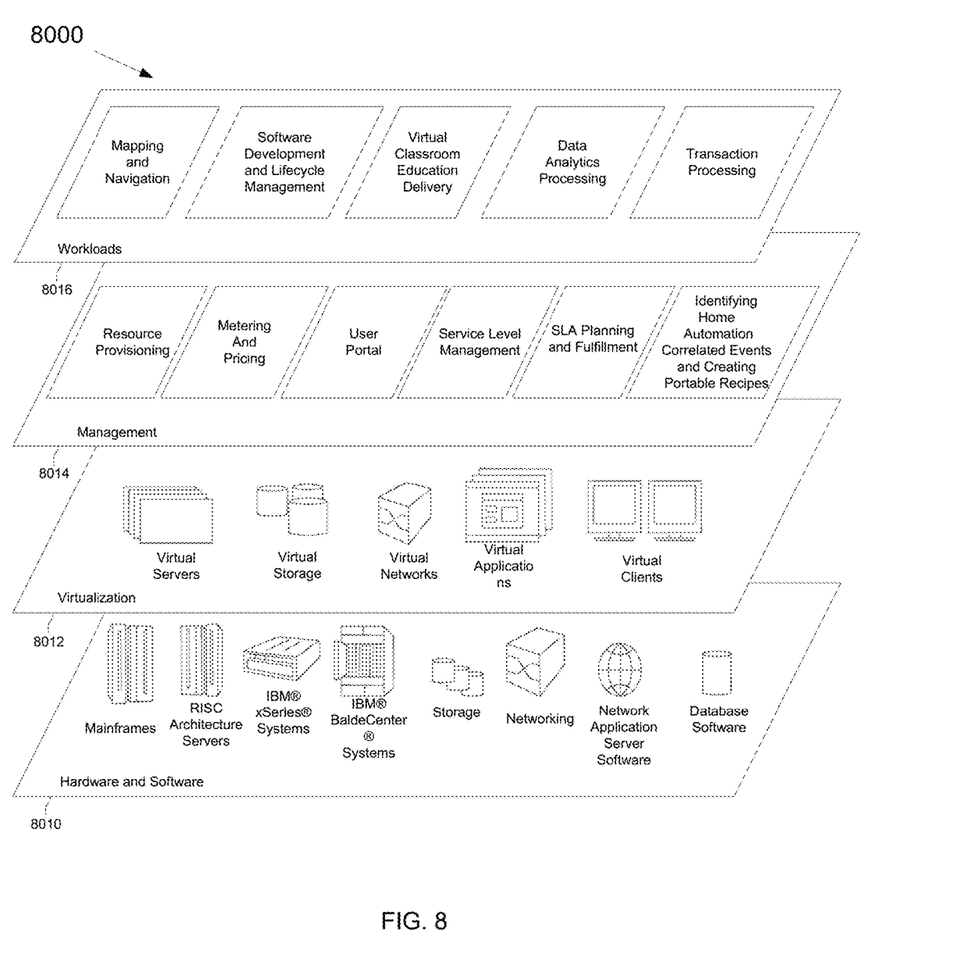
FIG. 8 is a block diagram of functional layers of the illustrative cloud computing environment of FIG. 7, in accordance with an embodiment of the present disclosure.

Referring now to FIG. 8, a set of functional abstraction layers 8000 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 8010 includes hardware and software components. Examples of hardware components include: mainframes; RISC (Reduced Instruction Set Computer) architecture based servers; storage devices; networks and networking components. In some embodiments, software components include network application server software.

Virtualization layer 8012 provides an abstraction layer from which the following examples of virtual entities may be provided: virtual servers; virtual storage; virtual networks, including virtual private networks; virtual applications and operating systems; and virtual clients.

In one example, management layer 8014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An identifying home automation correlated events and create portable recipe program may create an abstraction of user behavior patterns and an underlying sensor/actuator architecture. As such, the "environment recipe" may be generated from at least one place and may be applied to any other place as long as the sensor/actuator architecture matches the stored sensor/actuator.

Workloads layer 8016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving a smart location interaction system by creating at least one portable environment recipe associated with at least one user and associated with an underlying architecture, wherein the underlying architecture is connected to a server and comprises an underlying actuator architecture and an underlying sensor architecture to control the smart location interaction system comprising an air conditioner, a television, and a refrigerator, the method comprising:

collecting, by the server, a plurality of behavior data associated with the underlying architecture and the at least one user during a specific time, wherein the at least one user is located at a first location;

analyzing the collected plurality of behavior data;

identifying at least one behavior pattern based on the analyzed plurality of behavior data and the specific time;

creating the at least one portable user behavior pattern based on the identified at least one behavior pattern;

uploading the created user behavior pattern along with a device binding policy to a repository as a part of the environment recipe, wherein the repository is a storage that allows the at least one user to upload or download the environment recipe;

identifying the at least one user, wherein the at least one user is located at a second location;

locating the uploaded user behavior pattern and the uploaded device binding policy associated with the at least one identified user;

determining that each device within the uploaded device binding policy matches each device located at the second location;

downloading the located user behavior pattern associated with the at least one identified user;

predicting settings suitable for a user at the second environment based on the located user behavior pattern;

porting the predicted settings to the smart location interaction system of the second location by uploading the downloaded user behavior pattern; and controlling each determined device located at the second location that matched each device within the uploaded device policy during the specific time based on the predicted settings.

2. The method of claim 1, wherein the at least one created user behavior pattern updated by the at least one user.

3. The method of claim 1, wherein the at least one portable user behavior pattern comprises of at least one of a user profile, a plurality of user behaviors patterns, and an environment manifest.

4. The method of claim 1, wherein the repository is a cloud based storage repository.

5. The method of claim 1, wherein the at least one portable user behavior pattern is generated from at least one primary location applied to at least one secondary location when a sensor architecture associated with the primary location or an actuator architecture associated with the primary location matches a sensor architecture associated with the secondary location or an actuator architecture associated with the secondary location.

6. The method of claim 1, wherein the server recognizes a plurality of users in the second location and selects an appropriate environment recipe that is suitable for the plurality of users in the second location.

7. The method of claim 1, further comprising:
recognizing a plurality of users in the second location; and
selecting an appropriate user behavior pattern that is suitable for the plurality of users in the second location.

* * * * *